United States Patent [19]

Nihei

[11] Patent Number: 4,742,983
[45] Date of Patent: May 10, 1988

[54] SEAT SLIDING DEVICE

[75] Inventor: Masao Nihei, Kanagawa, Japan

[73] Assignee: Ohi Seisakusho Co., Ltd., Yokohama, Japan

[21] Appl. No.: 74,761

[22] Filed: Jul. 17, 1987

[30] Foreign Application Priority Data

Jul. 25, 1986 [JP] Japan .................. 61-175427

[51] Int. Cl.⁴ ............................. B60N 1/04
[52] U.S. Cl. .................... 248/429; 248/419; 297/341
[58] Field of Search ........... 248/429, 430, 424, 419, 248/420; 297/341

[56] References Cited

U.S. PATENT DOCUMENTS

| 4,101,169 | 7/1978 | Muraishi et al. | 297/341 |
| 4,159,147 | 6/1979 | Kiyomitsu et al. | 279/341 |
| 4,449,752 | 5/1984 | Yasumatsu et al. | 297/341 |
| 4,671,571 | 6/1987 | Gionet | 248/429 X |

FOREIGN PATENT DOCUMENTS

| 47923 | 4/1980 | Japan | 297/341 |
| 91427 | 7/1980 | Japan | 297/341 |
| 91426 | 7/1980 | Japan | 297/341 |
| 58-26818 | 6/1983 | Japan . | |
| 35634 | 2/1985 | Japan | 297/341 |
| 1583369 | 1/1981 | United Kingdom . | |

Primary Examiner—Alvin C. Chin-Shue
Attorney, Agent, or Firm—Foley & Lardner, Schwartz, Jeffery, Schwaab, Mack, Blumenthal & Evans

[57] ABSTRACT

Herein disclosed is a seat sliding device which generally comprises a latch mechanism for latching a movable rail to a stationary and a walk-in mechanism for moving the seat forward when a seatback of the seat is inclined forward. The walk-in mechanism comprises a transmission member which cancels the latched engagement between the movable and stationary rails when turned in a given direction about an operation shaft of the latch mechanism, a memory lever pivotally supported by the transmission member and actable as a prop for keeping the transmission member in the latched engagment cancelling condition and a stepped elongate member fixed to the stationary rail and engageable with the memory lever in a manner to cancel the function of the prop when the seat is slided to a given position with the seatback inclined forward.

15 Claims, 3 Drawing Sheets

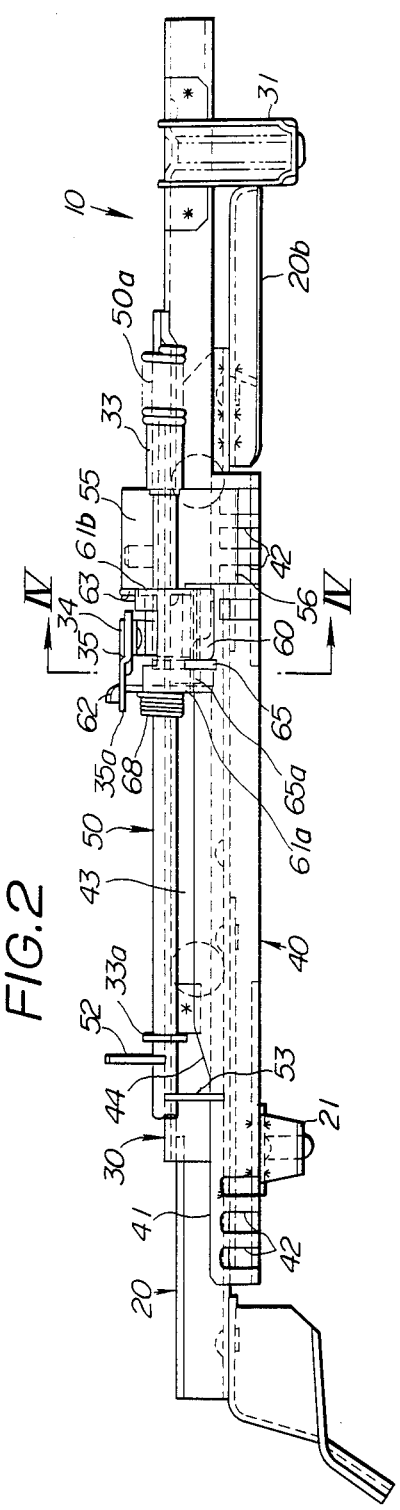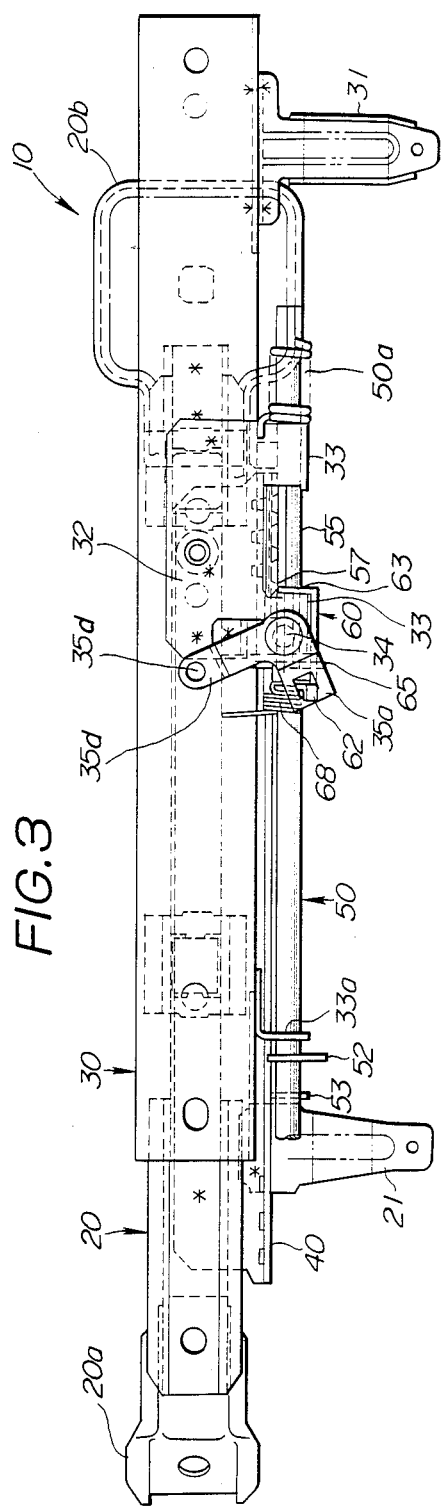

SEAT SLIDING DEVICE

BACKGROUND OF THE INVENTION

1. Field of the Invention

The present invention relates to in general to automotive seats and more particularly to a seat sliding device for sliding a seat on a vehicle floor to a desired position. More specifically, the present invention is concerned with the seat sliding devices of a type having a walk-in mechanism by which egress and ingress of a rear seat passenger is facilitated.

2. Description of the Prior Art

Hitherto, various types of seat sliding devices have been proposed and put into practical use particularly in the field of motor vehicles. Some are of a type which is equipped with a so-called "walk-in" mechanism which, for facilitation of egress and ingress of a rear seat passenger, permits a forward movement of the seat when the seatback of the seat is inclined forward. However, some of the conventional seat sliding devices of such type are compelled to have bulky and heavy constructions because of their inherencies originating from complicated arrangement of numerous parts employed therein. As is known, this bulky and heavy construction narrows the field wherein such seat sliding devices are practically used.

SUMMARY OF THE INVENTION

It is therefore an essential object of the present invention to provide a seat sliding device of a type having a walk-in mechanism, which is compact in size and light in weight.

According to the present invention, there is provided a seat sliding device for sliding a seatback-mounted seat on a floor to a desired position, which comprises two pairs of rail units each including a stationary rail secured to the floor and a movable rail slidably engaged with the stationary rail and mounting thereon the seat, a latch mechanism including a lock plate formed with a plurality of aligned notches and secured to the stationary rail, an operation shaft carried by the movable rail in a manner to be rotatable about the axis thereof, and a latching plate fixed to the operation shaft to be rotatable therewith, the latching plate being latchingly engaged with one of the notches of the lock plate when the operation shaft is turned in a first given direction, and a walk-in mechanism including a transmission member which is pivotally supported by the operation shaft and cancels the latched engagement between the latching plate and the lock plate when turned in a second given direction opposite to the first given direction to assume a given angular position, a memory lever which is pivotally supported by the transmission member and acts as a prop for keeping the transmission member at the given angular position when assuming a given condition and a stepped elongate member which is fixed to the stationary rail and causes the memory lever to cancel the given condition when the movable rail assumes a given position relative the stationary rail.

BRIEF DESCRIPTION OF THE DRAWINGS

Other objects and advantages of the present invention will become apparent from the following description when taken in conjunction with the accompanying drawings, in which:

FIG. 2 is a side view of the seat sliding device of the invention;

FIG. 3 is a plan view of the seat sliding device;

DETAILED DESCRIPTION OF THE INVENTION

Figure 1:
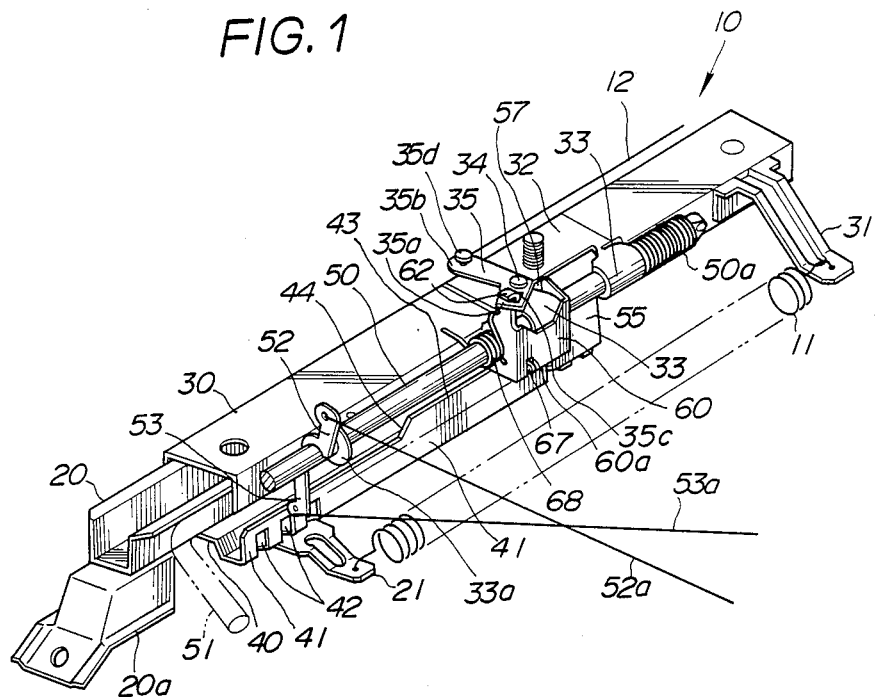
FIG. 1 is a perspective view of a seat sliding device according to the present invention.

Referring to the accompanying drawings, particularly FIG. 1, there is shown a seat sliding device of the present invention. It is to be noted that upon practical use, the device is arranged to support thereon one lateral side of a seat (not shown). The other lateral side of the seat is supported by another seat sliding device which is substantially the same in construction as the illustrated device except for a walk-in mechanism which will be described hereinafter. Thus, for facilitation of the description, only the illustrated device, viz., the right device, will be explained in detail with reference to the drawings.

Referring to the drawings, particularly FIG. 1, the seat sliding device comprises a rail unit 10 which is constructed to slide the seat forward or rearward relative to a vehicle floor (not shown) on which the seat sliding device is mounted.

The rail unit 10 comprises an elongate stationary rail 20 which is mounted to the vehicle floor through front and rear brackets 20a and 20b and a movable rail 30 which is slidably disposed on the stationary rail 20 and mounts thereon the seat.

Figure 4:
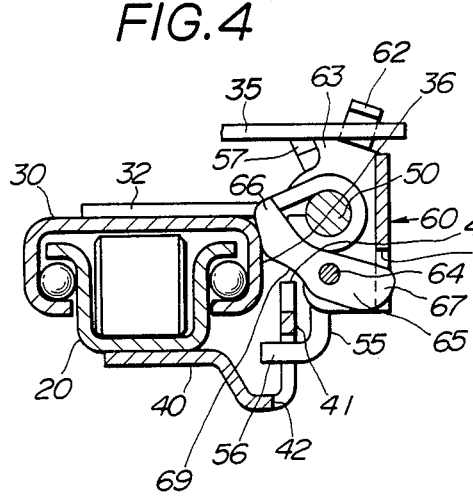
FIG. 4 is a sectional view taken along the line IV—IV of FIG. 2.

As is best seen from FIG. 4, the stationary rail 20 is of a flanged channel member which comprises a bottom wall, parallel side walls raised vertically from respective sides of the bottom wall and flanges extending outwardly from the tops of the respective side walls, while the movable rail 30 has a generally C-shaped cross section, which comprises a major flat wall, parallel side walls extending downwardly from respective sides of the major flat wall and flanges extending inwardly, viz., toward each other from the lower ends of the side walls. As is seen from the drawing, upon coupling of the movable and stationary rails 30 and 20, the inwardly flanged side walls of the movable rail 30 embrace the outward flanges of the stationary rail 20 in a manner to provide a loosed interlocking therebetween. Two rollers (no numerals) are disposed in an elongate space defined within the coupled movable and stationary rails 30 and 20 so as to smooth the movement of the movable rail 30 relative to the stationary rail 20. Balls (not shown) are rotatably received in elongate side spaces each being defined by the flanged side walls of the stationary rail 20 and the flanged side walls of the movable rail 30. With these balls, lateral and vertical play of the movable rail 30 relative to the stationary rail 20 is suppressed or at least minimized.

An elongate lock plate 40 is secured to a bottom of the stationary rail 20 and extends along the same. The lock plate 40 is formed with a lateral extension having an elongate vertical wall 41 which faces toward the other seat sliding device (not shown). The elongate vertical wall 41 is formed with a plurality of aligned notches 42. As is seen from FIG. 1, a front bracket 21 is secured to a front portion of the stationary rail 20, and a rear bracket 31 is secured to a rear portion of the movable rail 30. A helper spring 11 is stretched between the front and rear brackets 21 and 31 to bias the movable rail 30 forward relative to the stationary rail 20. To a generally middle portion of the movable rail 30, there is secured another bracket 32 which has at its inboard side a pair of curled portions 33 by which an elongate operation shaft 50 is rotatably supported. As shown in the drawing, the elongate operation shaft 50 extends along the rail unit 10 and has a front portion rotatably held by a supporting bracket 33a secured to the movable rail 30. A return spring 50a is disposed about a rear end portion of the operation shaft 50 to bias the same in a clockwise direction in FIG. 1. The front end portion of the operation shaft 50 is bent to form a handle 51.

The operation shaft 50 has, near the supporting bracket 33a, oppositely extending arms 52 and 53 secured thereto. From the arms 52 and 53, respective wires 52a and 53a extend to corresponding parts of the other seat sliding device (not shown).

The operation shaft 50 has, between the curled portions 33 of the bracket 32, a latching plate 55 secured thereto, which has a pawl 56 latchingly engageable with the notches 42 of the lock plate 40. A return spring 50a is disposed about the operation shaft 50 having one end hooked to the curled portion 33 of the bracket 32 and the other end connected to the operation shaft 50. With this, the operation shaft 50 is biased to rotate in a clockwise direction in FIG. 1, that is, in the direction to bring the pawl 56 of the latching plate 55 into locking engagement with the notches 42 of the lock plate 40.

Thus, it will be appreciated that the lock plate 40, the operation shaft 50, the latching plate 55 and the return spring 50a constitute a so-called seat latching mechanism.

Figure 5:
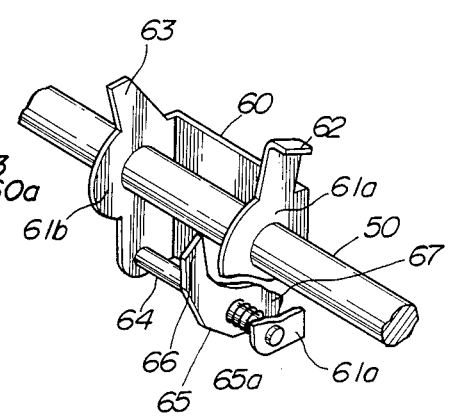
FIG. 5 is a perspective view of essential parts of a walk-in mechanism employed in the seat sliding device of the present invention.

As is seen from FIGS. 1, 4 and 5, a bell crank lever 35 is pivotally connected to the bracket 32 through a vertical pin 34. An inside arm 35a of the bell crank lever 35 is formed with an opening 35c for the purpose which will be described hereinafter, and an outside arm 35b of the bell crank lever 35 is provided with a pin 35d to which a wire 12 is fixed. Although not shown in the drawings, a known device is mounted to the associated seat for pulling the wire 12 when a seatback (not shown) of the seat is inclined forward.

As will be well seen from FIGS. 1 and 5, a transmission member 60 is pivotally disposed about the operation shaft 50 at the position near the bell crank lever 35. As is seen from FIG. 5, the transmission member 60 has parallel side walls 61a and 61b which have bores (no numerals) through which the operation shaft 50 passes. One side wall 61a is formed with an engaging arm having a bent top 62, and the other side wall 61b is formed with a latch cancelling arm 63. Upon assembly, the bent top 62 of the side wall 61a is engaged with the opening 35c of the bell crank lever 35 thereby to convert the pivotal movement of the bell crank lever 35 to a pivotal movement of the transmission member 60 about the operation shaft 50, and the latch cancelling arm 63 of the other side wall 61b is in contact with an upper portion 57 of the latching plate 55. Thus, when, as viewed in FIG. 4, the transmission member 60 is pivoted about the operation shaft 50 in a counterclockwise direction due to a pulling action of the wire 12, the latching plate 55 is forced to rotate in the same direction, that is, in a direction to cause the pawl 56 to disengage from the notches 42 of the lock plate 40. However, when the latching plate 55 is rotated in a counterclockwise direction due to rotation of the operation shaft 50 in the same direction, the transmission member 60 is kept unmoved.

As is seen from FIG. 5, between the side walls 61a and 61b of the transmission member 60, there is spanned a pivot shaft 64 which has a memory lever 65 secured thereto. Due to the work of a coil spring 65a disposed about the pivot shaft 64, the memory lever 65 is biased in a counterclockwise direction in FIG. 4, that is, in such a direction that an outside end 66 of the memory lever 65 is moved downward in FIG. 5. As is seen from FIG. 4, the outside end 66 is formed with a smoothly curved lower portion for the purpose which will become clarified as the description proceeds. An inside end 67 of the memory lever 65 is spacedly received in a slit 60a formed in a base wall (no numeral) of the transmission member 60. Thus, the degree of the pivotal movement of the memory lever 65 is determined by the size of the slit 60a. It is to be noted that, as is seen from FIG. 4, the outside end 66 of the memory lever 65 is in contact with an inboard side wall 36 of the movable rail 30. As is seen from FIG. 1, a coil spring 68 is disposed about the operation shaft 50 in order to bias the transmission member 60 in a clockwise direction in FIG. 1 (and in FIG. 4). The biasing force of the coil spring 68 is so determined as to supress only the play of the transmission member 60.

As is seen from FIG. 4, the notched vertical wall 41 of the lock plate 40 has an upper edge 43 to which, under an after-mentioned given condition, a lower edge 69 of the memory lever 65 is slidably engaged. As is seen from FIG. 1, the upper edge 43 of the notched vertical wall 41 is formed at its generally middle portion with an inclined gap 44 which serves as a cam for actuating the memory lever 65.

Thus, it will be appreciated that the transmission member 60, the memory lever 65 and the cam 44 of the lock plate 40 constitute a so-called "walk-in" mechanism.

In the following, operation of the seat sliding device of the present invention will be described with reference to FIGS. 1, 4 and 6a to 6d.

For ease of description, it will be commenced with respect to a condition wherein a passenger is normally seated on the seat which, as may be understood from FIG. 1, assumes a relatively rear position having the transmission member 60 positioned at the rear of the inclined gap 44. Under this condition, as is shown in FIG. 4, the pawl 56 of the latching plate 55 is engaged with one of the notches 42 of the lock plate 40 and the memory lever 65 has its outside end 66 contact with the inboard shoulder portion of the inboard side wall 36 of the movable rail 30 keeping the transmission member 60 at its normal position. That is, under this condition, the movable rail 30 on which the seat is mounted is latched to the stationary rail 20 by means of the seat latching mechanism.

When now the handle 51 of the operation shaft 50 is manually turned in a counterclockwise direction in FIG. 1, the latching plate 55 secured thereto is rotated in the same direction disengaging the pawl 56 thereof from the notch 42 of the lock plate 40 thereby cancelling the latched condition of the movable rail 30. For the reason as has been described hereinafore, the counterclockwise rotation of the operation shaft 50 does not induce any movement of the transmission member 60.

Anyhow, with the turning of the handle 51, the upper portion 57 of the latching plate 55 is moved away from the arm 63 of the transmission member 60 having no effect upon the transmission member 60. This condition will be understood from FIG. 6a. More specifically, the seat sliding for the seat position adjustment is achieved by pushing or pulling the seat with the handle 51 kept pulled toward the operator on the seat.

Figure 6A:
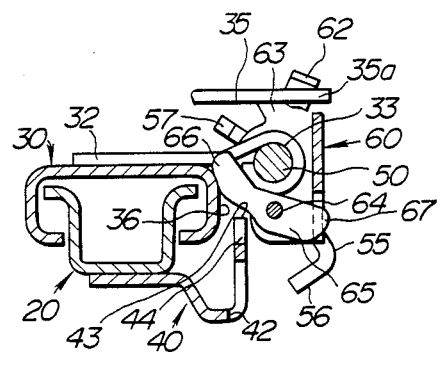
FIGS. 6a, 6b, 6c and 6d are sectional views similar to FIG. 4, but showing various conditions of the seat sliding device respectively.

When, upon the seat coming to a desired position, the handle 51 is released from the operator's hand, the operation shaft 50 is rotated by the force of the return spring 50a in a clockwise direction in FIG. 6a turning the latching plate 55 in the same direction. With this, the pawl 56 of the latching plate 55 is brought into latching engagement with a new notch 42 of the lock plate 40 thereby achieving latching of the seat at a new position.

When the seatback of the seat is inclined forward for the purpose of facilitating egress and ingress of a rear seat passenger, the wire 12 is pulled thereby turning the bell crank lever 35 in a clockwise direction in FIG. 1 about the pin 34. With this turning, the transmission member 60 is forced to rotate about the operation shaft 50 in a counterclockwise direction in FIG. 1 causing the arm 63 thereof to push the upper portion 57 of the latching plate 55, thereby turning the latching plate 55 in the same direction. (It is to be noted that this turning of the latching plate 55 induces a simultaneous turning of the operation shaft 50). Thus, the pawl 56 of the latching plate 55 is disengaged from the notch 42 of the lock plate 40 cancelling the latched condition of the seat.

Figure 6B:
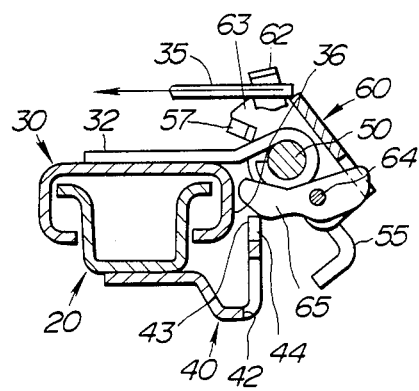
Figure 6C:
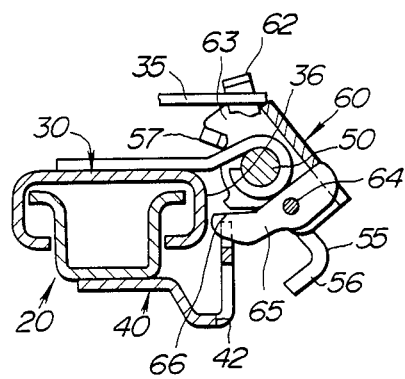
Figure 6D:
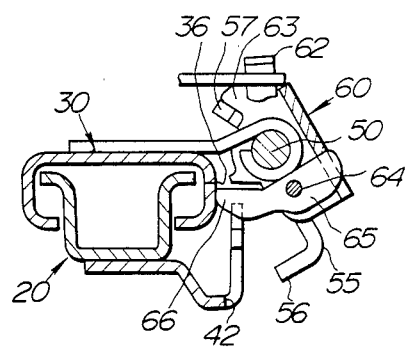

During this operation, as is seen from FIG. 6b, the memory lever 65 carried by the transmission member 60 is moved away from the inboard side wall 36 of the movable rail 30 while turning counterclockwise about the pivot shaft 64 by the force of the spring 65a (see FIG. 5). When the seat is at the above-mentioned relatively rear position, the memory lever 65 becomes put on the raised rear part of the upper edge 43 of the lock plate 40 as is seen from FIG. 6b, and by the work of the helper spring 11, the movable rail 30 on which the seat is mounted is moved forward to a foremost position where a stopper (not shown) is provided. During this forward movement, the memory lever 65 slides on the raised rear part of the upper edge 43 and slides down at the inclined gap 44 to the depressed front part of the upper edge 43 and finally comes to its foremost position on the upper edge 43 of the lock plate 40. Upon taking the foremost position, the memory lever 65 takes such an angular position as to face the outside end 66 thereof toward the inboard side wall 36 of the movable rail 30 as is seen from FIG. 6c. It is to be noted that this condition is maintained for a time when the seatback of the seat is kept inclined forward. Thus, the seat is freely movable rearward and forward with the seatback inclined forward.

When, upon completion of the egress or ingress of the rear seat passenger, the seatback of the seat is raised, the wire 12 becomes slackened. Thus, by the work of the spring 68 (see FIG. 1), the transmission member 60 is turned but slightly in a clockwise direction until the outside end 66 of the memory lever 65 becomes in contact with the inboard side wall 36 of the movable rail 30, as is seen from FIG. 6d. That is, due to this contact, the transmission member 60 is prevented from returning to its normal position, and thus, due to the interruption of the inclined transmission member 60, the latching plate 55 is prevented from engaging the pawl 56 thereof with the notches 42 of the lock plate 40 thereby permitting the free movement of the seat.

When thus the seat is pushed or pulled rearward with the seatback raised, the seat (viz., the movable rail 30) is moved rearward making the memory lever 65 slide on the upper edge 43 of the lock plate 40. When, during this rearward movement of the seat, the memory lever 65 gets over the inclined step 44, the same is forced to turn in a clockwise direction against the force of the coil spring 65a (see FIG. 5) and, by the aid of the force of the spring 68, the same becomes to assume the original position as shown in FIG. 4 wherein the outside end 66 thereof contacts the inboard shoulder portion of the movable rail 30. This clockwise turning of the memory lever 65 brings about a turning of the transmission member 60 in the same direction thereby permitting the latching plate 55 to turn in the same direction. With this, the pawl 56 of the latching plate 55 is brought into latching engagement with a predetermined notch 42 of the lock plate 40 to lock the seat at a given position relative to the stationary rail 20, viz., relative to the vehicle floor. Thereafter, the above-mentioned seat position adjustment is carried out by handling the operation shaft 50, if necessary.

As will be understood from the foregoing description, the parts of the seat sliding device of the invention are small in number and systematically arranged. Thus, according to the invention, compact and light weight construction is realized in the seat sliding device.

What is claimed is:

1. A seat slide device for sliding a seatback-mounted seat on a floor to a desired position, comprising:
   two pairs of rail units each including a stationary rail secured to said floor and a movable rail slidably engaged with said stationary rail and mounting thereon said seat;
   a latch mechanism including a lock plate formed with a plurality of aligned notches and secured to said stationary rail, an operation shaft carried by said movable rail in a manner to be rotatable about the axis thereof, and a latching plate fixed to said operation shaft to be rotatable therewith, said latching plate being latchingly engaged with one of said notches of the lock plate when said operation shaft is turned in a first given direction; and
   a walk-in mechanism including a transmission member which is pivotally supported by said operation shaft and cancels the latched engagement between said latching plate and said lock plate when turned in a second given direction opposite to said first given direction to assume a given angular position, a memory lever which is pivotally supported by said transmission member and acts as a prop for keeping said transmission member at said given angular position when assuming a given condition and a stepped member which is fixed to said stationary rail and causes said memory lever to cancel said given condition when said movable rail assumes a given position relative said stationary rail.

2. A seat sliding device as claimed in claim 1, in which said latch mechanism further comprises biasing means for biasing said operation shaft in said first given direction.

3. A seat sliding device as claimed in claim 2, in which said biasing means comprises a coil spring which is disposed about said operation shaft with one end fixed to said operation shaft and the other end hooked to a portion of said movable rail.

4. A seat sliding device as claimed in claim 2, in which said latching plate is formed with a pawl which is latchingly engageable with said notches of said lock plate.

5. A seat sliding device as claimed in claim 4, in which said lock plate and said operation shaft extend along the axis of one of said rail units.

6. A seat sliding device as claimed in claim 2, further comprising a helper spring which is stretched between said movable and stationary rails to bias said movable rail in one axial direction relative to said stationary rail.

7. A seat sliding device as claimed in claim 6, in which said walk-in mechanism further comprises a bell-crank lever which is pivotally connected to said movable rail to convert a forward inclination of said seat-back of the seat to the rotation of said transmission member in the second given direction.

8. A seat sliding device as claimed in claim 7, in which said walk-in mechanism further comprises biasing means for biasing said transmission member in said first given direction.

9. A seat sliding device as claimed in claim 8, in which said transmission member comprises:
- a base wall;
- spaced side walls raised from respective ends of said base wall, each side wall being formed with a bore through which said operation shaft passes;
- a first arm integral with one of said side walls and operatively engaged with said bell-crank lever in an articulated connecting manner; and
- a second arm integral with the other side wall and contatable with a part of said latching plate.

10. A seat sliding device as claimed in claim 9, in which the biasing means of said walk-in mechanism is a coil spring which is disposed about said operation shaft with one end hooked to one of said side walls of the transmission member and the other end hooked to said movable rail.

11. A seat sliding device as claimed in claim 9, in which said memory lever is pivotally disposed about a shaft which spans between said spaced side walls of said transmission member, said memory lever being biased in one direction by biasing means.

12. A seat sliding device as claimed in claim 11, in which said memory lever has a leading end portion which contacts with a part of said movable rail to allow said memory lever to act as the prop.

13. A seat sliding device as claimed in claim 12, in which said stepped elongate member is integral with said lock plate and has an upper edge on and along which said memory lever slides during the movement of said movable rail relative to said stationary rail, said upper edge being divided into two parts by an inclined gap formed therebetween.

14. A seat sliding device as claimed in claim 13, in which said memory lever is so arranged and constructed as to become said prop when said memory lever gets over said gap during the movement of said movable rail relative to said stationary rail.

15. A seat sliding device as claimed in claim 12, in which said memory lever has the other end portion which is spacedly received in a slit formed in the base wall of said transmission member.

* * * * *